(12) United States Patent
Chaudhry et al.

(10) Patent No.: US 8,627,322 B2
(45) Date of Patent: Jan. 7, 2014

(54) SYSTEM AND METHOD OF ACTIVE RISK MANAGEMENT TO REDUCE JOB DE-SCHEDULING PROBABILITY IN COMPUTER CLUSTERS

(75) Inventors: Geeta Chaudhry, Palo Alto, CA (US); Walfredo Cirne, Palo Alto, CA (US); Scott David Johnson, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 373 days.

(21) Appl. No.: 12/915,439

(22) Filed: Oct. 29, 2010

(65) Prior Publication Data

US 2012/0110584 A1 May 3, 2012

(51) Int. Cl.
*G06F 9/46* (2006.01)
(52) U.S. Cl.
USPC .......................................................... 718/102
(58) Field of Classification Search
USPC .......................................................... 718/102
See application file for complete search history.

(56) References Cited

U.S. PATENT DOCUMENTS

| 7,065,764 | B1 | 6/2006 | Prael et al. | |
|---|---|---|---|---|
| 2006/0195508 | A1* | 8/2006 | Bernardin et al. | 709/203 |
| 2008/0244601 | A1 | 10/2008 | Zeis et al. | |
| 2008/0256541 | A1 | 10/2008 | Rai | |
| 2009/0259500 | A1* | 10/2009 | Sahoo et al. | 705/7 |
| 2009/0300633 | A1 | 12/2009 | Altrichter et al. | |
| 2011/0029675 | A1* | 2/2011 | Yeow et al. | 709/226 |

* cited by examiner

*Primary Examiner* — Mengyao Zhe
(74) *Attorney, Agent, or Firm* — Birch, Stewart, Kolasch & Birch, LLP

(57) ABSTRACT

Systems and methods are provided for generating backup tasks for a plurality of tasks scheduled to run in a computer cluster. Each scheduled task is associated with a target probability for execution, and is executable by a first cluster element and a second cluster element. The system classifies the scheduled tasks into groups based on resource requirements of each task. The system determines the number of backup tasks to be generated. The number of backup tasks is determined in a manner necessary to guarantee that the scheduled tasks satisfy the target probability for execution. The backup tasks are desirably identical for a given group. And each backup task can replace any scheduled task in the given group.

23 Claims, 13 Drawing Sheets

SYSTEM AND METHOD OF ACTIVE RISK MANAGEMENT TO REDUCE JOB DE-SCHEDULING PROBABILITY IN COMPUTER CLUSTERS

BACKGROUND OF THE INVENTION

1. Field of the Invention

The present invention relates generally to risk management in computer clusters. More particularly, aspects of the invention relate to containing job de-scheduling risks within a target bound by creating backup tasks for heterogeneous tasks with similar resource requirements.

2. Description of Related Art

Computing power required by applications has been increasing at a tremendous rate. By aggregating the power of widely distributed resources, computer clusters permit organizations to boost their processing power through linked computers and a collection of shared resources such as computing nodes, processors, memory, databases, network bandwidth, I/O devices, etc. Heterogeneous application jobs/tasks are allocated with resources and scheduled to run in series or in parallel on different machines by cluster management infrastructure such as resource managers and job schedulers.

In a distributed computing environment, execution failures of the jobs or tasks already scheduled may occur for various reasons such as network failure, machine crash, power failure, overloaded resource conditions, distrusted security policy, competing tasks or jobs, or other incidents that lead to non-availability of scheduled and/or required resources.

SUMMARY OF THE INVENTION

To reduce such execution failures, aspects of the invention minimize the de-scheduling possibilities of the scheduled jobs or tasks due to the above-mentioned reasons in order to provide a risk-resilient cluster with a robust stay-scheduling capability.

In accordance with aspects of the invention, a system creates backup tasks for a plurality of tasks scheduled to run in a computer cluster. Each scheduled task is associated with a target probability for execution. Each scheduled task is executable by a first cluster element and a second cluster element. In one example, the first cluster element comprises a machine and the second cluster element includes a rack that houses the machine. The system classifies the scheduled tasks into different groups based on the resource requirements of each task. The system may determine, for each group, the number of backup tasks to be generated based on target probabilities of the scheduled tasks in the group. The system is configured to generate the backup tasks based on the determination, where each backup task in a given group is identical and can be employed to backup/replace any scheduled task in the group.

In accordance with one embodiment, a computer-implemented method is executable by a processor for allocating backup tasks to a plurality of tasks scheduled to run in a computer cluster. The method comprises classifying the plurality of scheduled tasks in groups based on one or more resource requirements associated with each task, each group containing at least one of the scheduled tasks; determining, for at least a respective one of the groups, a number of backup tasks necessary to guarantee that the scheduled tasks of the respective group satisfy a target probability for execution; and generating, with the processor, the backup tasks based on the determination, the generated backup tasks being identical, and each backup task in the respective group being configured to replace any scheduled task in the respective group.

In one example the computer cluster includes first and second cluster elements. Here, the first cluster element comprises a machine and the second cluster element comprising a rack that houses the machine. In an alternative, determining the number of backup tasks is based on at least one of a failure probability of the first cluster element and a failure probability of the second cluster element.

In another example, each scheduled task of the respective group is linked with a job, and each job is associated with the target probability for execution of its linked task. In a further example, each group contains tasks with identical resource requirements. In yet another example, one of the resource requirements for a selected one of the scheduled tasks is a memory range requirement.

In an alternative, the computer cluster includes a plurality of the first cluster elements and a plurality of the second cluster elements. Here, the method further comprises receiving, from each scheduled task, a preference for execution by a given one of the plurality of the first cluster elements or a given one of the plurality of the second cluster elements. In this case, the classification is performed based on the received preference.

In a further alternative, the method comprises determining a first cost to create the backup tasks for the respective group; for each group, determining a second cost to create additional backup tasks for a combination group that includes the respective group, the determining the second cost being obtained by dividing the plurality of scheduled tasks and the respective group; comparing the first cost with the second cost; creating the backup tasks for the respective group if the first cost is less than the second cost; and creating the additional backup tasks for the combination group if the first cost is larger than or equal to the second cost.

In one example, determining the number of backup tasks comprises iteratively calculating a probability of losing no more than all current backup tasks in a given one of the plurality of groups; comparing the calculated probability to the target probabilities for execution; adding one backup task to a class of the given group if the calculated probability is greater than all the target probabilities; and ceasing to add backup tasks to the given group if the calculated probability is smaller than all the target probabilities. In an alternative, calculating the probability is based on at least one of a failure probability of a first cluster element in the cluster, a failure probability of a second cluster element in the cluster, and the number of current backup tasks in the given group.

In another alternative, the cluster includes a plurality of first and second cluster elements, and calculating the probability further comprises: for each second cluster element used by the scheduled tasks in the given group, dividing the second cluster elements into sub-second-elements. In this case, the sub-second elements each include one or more of the first cluster elements. And each of the first cluster elements in each respective sub-second-element executes the same number of the scheduled tasks. For each sub-second-element, the method calculates a probability of losing no more than all the scheduled tasks therein based on a failure probability of the first cluster elements in the respective sub-second-element, the number of the first cluster elements in the respective sub-second element, and the number of the scheduled tasks in the respective sub-second-element.

In yet another example, the method further comprises monitoring task execution status and cluster status; and performing modification or deletion of the backup tasks in the respective group based on the monitoring.

In a further example, the computer cluster includes first and second cluster elements, and the method further comprises estimating a failure probability of the first cluster element and a failure probability of the second cluster element. In an alternative, determining the number of backup tasks is further based on a failure probability of a third cluster element in the computer cluster. Here, the third cluster element comprises at least a cluster element other than the first and the second cluster elements.

In accordance with another embodiment, a system is provided to generate backup tasks for a plurality of tasks scheduled to run in a computer cluster. The system comprises a memory and a processor coupled to the memory. The processor is configured to execute a set of instruction stored in the memory to classify the plurality of scheduled tasks in groups based on one or more resource requirements associated with each task. Each scheduled task is associated with a target probability for execution. Each scheduled task is executable by a first cluster element and a second cluster element. Each group contains at least one of the scheduled tasks. The processor is also configured to determine, for at least a respective one of the groups, a number of backup tasks necessary to guarantee that the scheduled tasks of the respective group satisfy the target probability for execution. The processor is further configured to generate the backup tasks based on the determination. The generated backup tasks in the respective group are identical. And each backup task in the respective group is configured to replace any scheduled task in the respective group.

In one example, one of the resource requirements for a selected one of the scheduled tasks is a memory range requirement. In another example, the first cluster element comprises at least one of a plurality of machines and the second cluster element comprises at least one of a plurality of racks.

In a further example, the first cluster element comprises a plurality of the first cluster elements, the second cluster element comprises a plurality of the second cluster elements, and the processor is further configured to receive, from each scheduled task, a preference for execution by a given one of the plurality of the first cluster elements or a given one of the plurality of the second cluster elements. Here, the classification is performed based on the received preference.

In another example, the processor is further configured to determine a first cost to create the backup tasks for the respective group. For each group, the processor is configured to determine a second cost to create additional backup tasks for a combination group that includes the respective group. The determined second cost is obtained by dividing the plurality of scheduled tasks and the respective group. The processor is further configured to compare the first cost with the second cost, to create the backup tasks for the respective group if the first cost is less than the second cost, and to create the additional backup tasks for the combination group if the first cost is larger than or equal to the second cost.

In yet another example, the processor determines the number of backup tasks by iteratively executing the instructions for calculating a probability of losing no more than all current backup tasks in a given one of the plurality of groups; comparing the calculated probability to the target probabilities for execution; adding one backup task to a class of the given group if the calculated probability of losing no more than all current backup tasks is greater than all the target probabilities; and ceasing to add backup tasks to the given group if the calculated probability is smaller than all the target probabilities.

In an alternative, the first cluster element comprises a plurality of first cluster elements and the second cluster element comprises a plurality of second cluster elements. Here, the processor is further configured to calculate a probability of losing no more than all current backup tasks in a given group by: for each second cluster element used by the scheduled tasks in the given group, dividing the second cluster element into sub-second-elements. The sub-second-elements each include one or more of the first cluster elements. Each of the first cluster elements in each respective sub-second-element executes the same number of the scheduled tasks. For each sub-second-element, the processor is further configured to calculate a probability of losing no more than all the scheduled tasks therein based on a failure probability of the first cluster elements in the respective sub-second-element, the number of the first cluster elements in the respective sub-second-element, and the number of the scheduled tasks in the respective sub-second-element.

In another alternative, the processor is further configured to monitor task execution status and cluster status, and perform modification or deletion of the backup tasks in the respective group based on the monitoring. In an additional example, the processor is further configured to estimate a failure probability of the first cluster element and a failure probability of the second cluster element. And in a further example, the processor is additionally configured to determine the number of backup tasks based on a failure probability of a third cluster element in the computer cluster. Here, the third cluster element comprises at least a cluster element other than the first and the second cluster elements.

DETAILED DESCRIPTION

Aspects, features and advantages of the invention will be appreciated when considered with reference to the following description of exemplary embodiments and accompanying figures. The same reference numbers in different drawings may identify the same or similar elements. Furthermore, the following description is not limiting; the scope of the invention is defined by the appended claims and equivalents.

Figure 1:
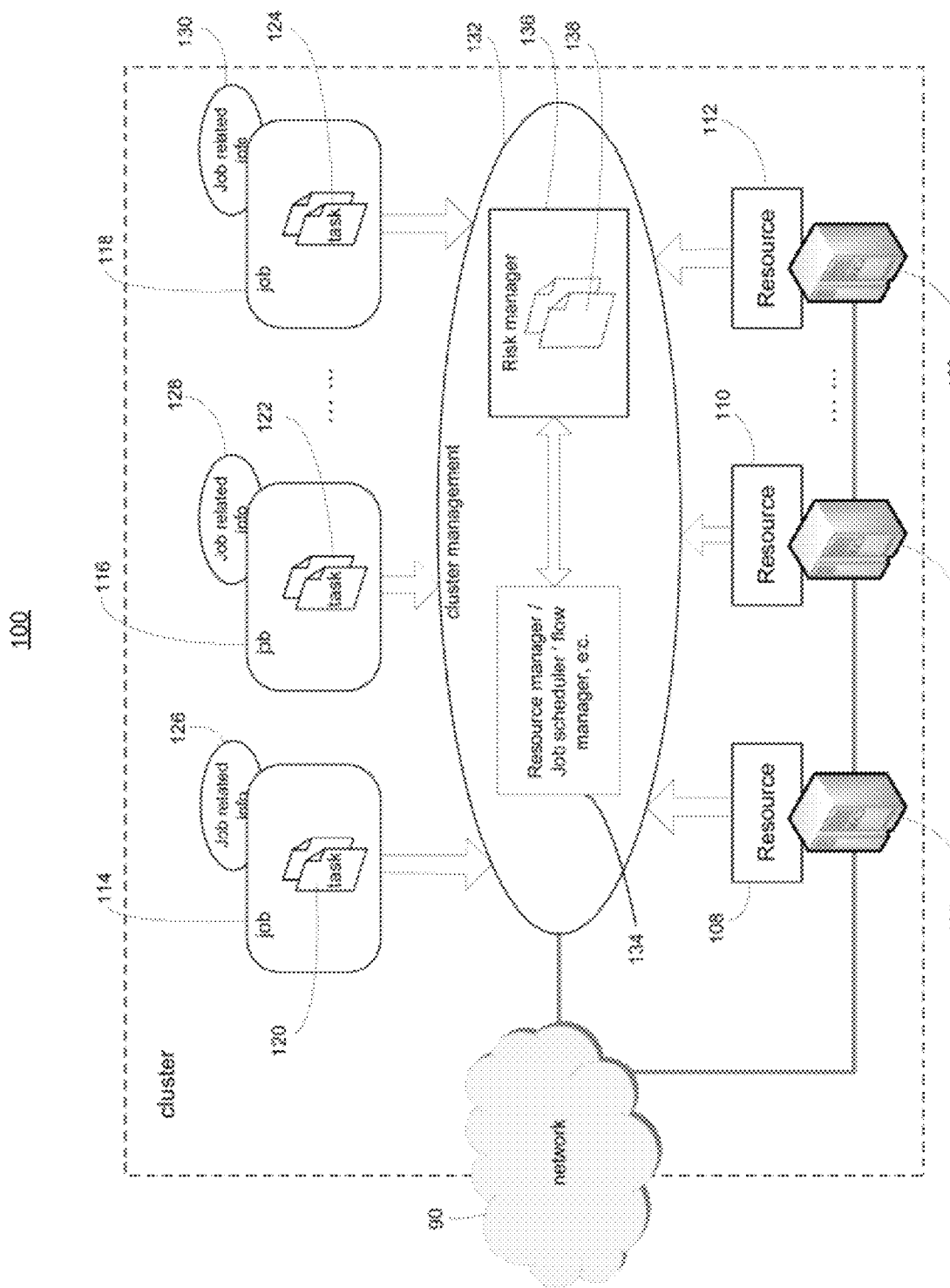
FIG. 1 is a diagram of a network environment in accordance with aspects of the invention.

As shown in FIG. 1, a computer cluster 100 in accordance with aspects of the invention includes one or more network computing elements 102, 104 and 106 for performing job/task processing. The cluster may be any type of distributed computing system. For example, cluster 100 may be a high-availability cluster that includes redundant processing entities to improve the availability of services, or a load-balancing cluster that has one or more load-balancing front ends which all workload come through and are distributed to a collection of back end servers.

In other scenarios, cluster 100 may be a high-performance cluster that divides a computational task into chunks and distributes the chunks across many different processing entities in the cluster. In further examples, cluster 100 may be a grid cluster that supports more heterogeneous collections. Alternatively, the cluster may be a dedicated cluster that performs parallel computing across entire cluster or a non-dedicated cluster that allows certain applications to be executed in idle CPU cycles.

Cluster computing elements such as 102, 104 and 106, also known as processing entities, may communicate with each other through network 90. Network 90 may include various types of intervening nodes such as routers, gateways, servers, databases and operation terminals. Network 90 may also comprise various configurations and use various protocols including wide area networks, local area networks, wireless networks, personal area networks, virtual private networks, private networks using communication protocols proprietary to one or more companies and various combinations of the foregoing. Although only a few network nodes are depicted in FIG. 1, it should be appreciated that a typical cluster can include a large number of connected computers. Such communication may be facilitated by any device capable of transmitting data to and from other computers, such as Ethernet network interfaces, T1 lines, fiber optic cables, and/or wireless interfaces.

Each network computing element 102, 104 and 106 may reside on a unique network node and may comprise various types of computing facilities. For example, computing element 102 may be an independent computing machine with its own operating system, memory, processor(s), input/output bus, network adapters, etc. In another example, processing entity 104 may be a rack server comprising at least one machine.

Each processing entity is associated with various hardware and software resources, such as resources 108, 110 and 112, respectively. These hardware and software resources may include processors, memory, disks, tapes, swaps, input/output devices or interfaces, network bandwidth, network connections, licenses, or any other site-specific resources. As such, cluster 100 has a set of distributed and heterogeneous resources that may be centrally or locally managed and utilized by the incoming application jobs/tasks. These resources may be allocated to and shared across multiple jobs or tasks.

Jobs 114, 116 and 118 may come from one or more user applications. Each job may comprise a series of individual tasks. For example, job 114 may include one or more tasks 120. Job 116 may include a series of tasks 122 and job 118 may include tasks 124. These tasks may be linked as parallel tasks, or may be dependent or sequential tasks. Each job may be performed on a cluster of processors. The tasks may be discrete blocks of executable code or functions that may be performed on one or more processors in the cluster. Tasks may have specific input or output data that is shared between certain tasks and may be the basis for relationships between tasks.

Each job is desirably associated with a set of job-related information. For instance, job 114 may be associated with information 126, job 116 may be associated with information 128, and job 118 may be associated with information 130. The job-related information may include one or more job objectives, performance goals, policies, restrictions and/or preferences. The performance goals may include a probability target for a given job to stay scheduled. For example, if the probability target is 99.999% for job 114, it means that this job requires a guarantee with a probability of 99.999% that the job will stay scheduled in the face of expected unavailability of resources due to events such as machine/rack failures.

The job-related information may also include a range of resource requirements for each job, including the minimum or the maximum resources needed. Each job or task may have separately defined resources required to implement the job or task. Thus, each job or task may use a range of the shared cluster resources 108-112 on different levels. In one example, a job or a task may require a single resource such as a single processor or a single software license. In another example, a job or a task may require multiple resources. A task may be configured run with either a minimum amount of memory or a maximum amount of memory.

In other examples, each job or task may be configured to use multiple resources spanning different categories of resources. For instance, task 120 may use 1.0 CPU, 1 GB RAM, a specific software license and a certain amount of network bandwidth, while task 122 may require no specific software license or network bandwidth, but certain I/O devices, 2.0 CPU and 0.5 GB RAM. The job-related info may also include restrictions or preferences information such as machines or racks to avoid or to prefer, etc.

The job-related information may further include any other type of objectives pre-established by the application that dispatches the job. These objectives may include, for instance, job or task initiation requirements, target job or task completion time, etc. In other examples, these performance goals may also be set by an administrative infrastructure or other entity associated with the cluster, such as cluster management infrastructure 132 illustrated in FIG. 1.

The cluster management infrastructure 132 may perform various kinds of cluster management functions, including managing the cluster resources and scheduling the application jobs or tasks to run on the designated hardware and software platforms. The cluster management infrastructure 132 may comprise one or more software layers that include various management modules or functions running on centralized servers or on distributed host platforms.

For example, the management infrastructure may include one or more modules 134 for performing resource management, job scheduling, flow management, etc. These management modules may analyze the incoming jobs and tasks to determine the minimum and maximum amount of resources required for each job or task. Jobs and tasks may be scheduled when the required resources become available. The management modules may also determine scheduling weights or priority values based on pre-established policies and job objectives, and perform job scheduling accordingly. The per job stay-scheduled probability target may also be determined by the cluster management infrastructure 132 based on various factors (e.g., control policy of the cluster, priority of the job/task, etc).

Risk manager 136 may be implemented as a separate management module in addition to other cluster administrative functions, as illustrated in FIG. 1. Alternatively, the risk manager 136 may be implemented as part of any of the other functional modules such as a job scheduler, a resource manager or a backup task manager. The risk manager 136 is responsible for determining the number of backup tasks needed to guarantee the stay-scheduled probability target.

Specifically, the risk manager 136 classifies the incoming tasks across heterogeneous jobs based on their respective resource requirements. Classification of the tasks may be performed such that the tasks with similar resource requirements are grouped into the same class. The risk manager may receive the pre-established degree of similarity from the cluster management policy. In further embodiments, the risk manager or the cluster management infrastructure (e.g., in the risk manager) may be configured to dynamically adjust and improve the degree of similarity based on previous performance of the system.

Then the risk manager 136 estimates the de-scheduling probabilities of the tasks in each class based on a variety of pre-established assumptions and predetermined failure probabilities of the network elements involved in the task executions. The predetermined failure probabilities may include failure probabilities of machines, racks, switches, or any other types of computing facilities. These failure probabilities may be estimated by and obtained from other cluster management entities. Alternatively, estimation of these failure probabilities may be performed by the risk manager 136.

Based on the estimated de-scheduling probabilities and the stay-scheduled probability target associated with tasks in the class, the risk manager 136 determines how many backup tasks are needed by a given class to guarantee the tasks therein with the stay-scheduled probability targets. The risk manager may then generate the backup tasks for each class accordingly. Alternatively, the risk manager may pass the determined number of backup tasks to other cluster management entities (e.g., a backup task manager, not shown) to have the backup tasks generated for each group.

A backup task may be defined by a collection of information such as the task name, the tasks that are to be backed up, the location where the backup task will be saved, the resource requirements and resource locations in the cluster, and backup options for the particular backup task. In system 100, a number of identical backup tasks 138 are created by the risk manager 136 for each class. Each backup task 138 is able to replace any task with a given class. As such, in a given class, each backup task 138 is linked with a set of cluster resources sufficient to support any scheduled task in the class.

In one example of system 100, the stay-scheduled probability targets may be received by the risk manager 136 as part of the job/task objectives included in the job-related information 126, 128 and/or 130. In another example, the stay-scheduling probability may be determined by a resource manager or a job scheduler, or the risk manager, or other management module in the cluster management infrastructure.

The resource requirements may be provided by each incoming job/task, or may be determined and monitored by the risk manager. For example, risk manager 136 may have a job/task analyzer module that determines the maximum or minimum resource requirements to initiate or execute a job/task based on the job objectives and any relevant policy of the cluster.

The risk manager 136 may also perform job/task monitoring functions to monitor the job/task changes and execution status. The risk manager 136 may also monitor the status of machines, racks or various other computing facilities in the cluster. Alternatively, the risk manager 136 may receive the job/task execution status, machine or rack status, or other cluster status information from other cluster management modules such as a resource manager and a job scheduler. Based on the monitored information, the risk manager 136 may adjust or optimize the backup tasks in each class by adding new backup tasks, deleting or modifying existing backups.

Figure 2:
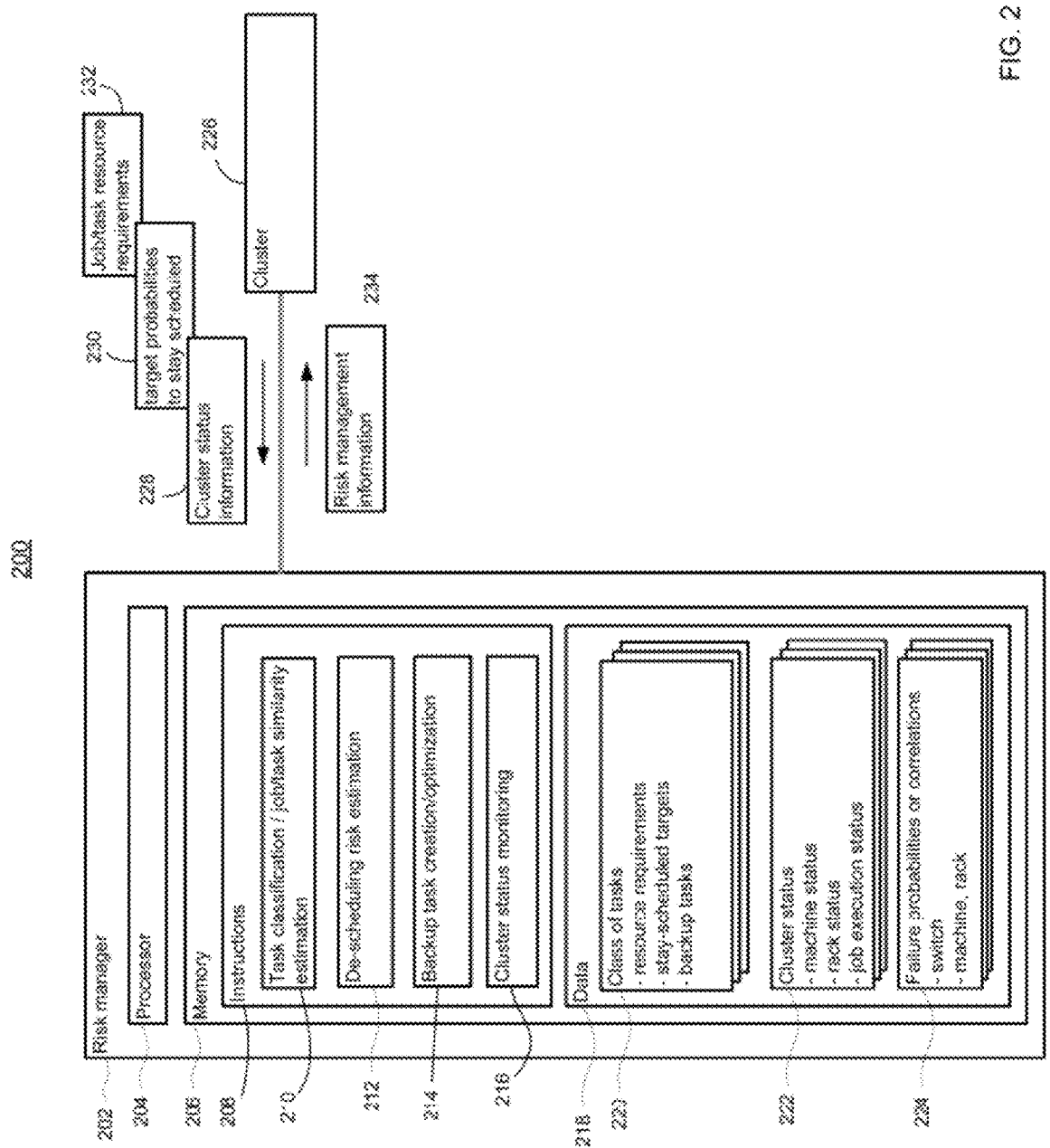
FIG. 2 is a functional diagram in accordance with aspects of the system of FIG. 1.

FIG. 2 shows a system block diagram 200 in accordance with aspects of the invention. As illustrated, the risk manager 202 (equivalent to the risk manager 136 in FIG. 1) may reside on one node in cluster 226. The risk manager 202 may obtain various information from cluster 226 and generate risk management information accordingly. The risk manager 202 may also comprise a plurality of computers that exchange information with different nodes of a network for the purpose of receiving, processing and transmitting data to other machines or operation terminals.

As shown in FIG. 2, the risk manager 202 may be a computer (e.g., a server) that contains a processor 204, memory 206 and other components typically present in general purpose computers. Processor 204 may be any conventional processor, such as off-shelf processors from Intel Corporation or Advanced Micro Devices. Alternatively, the processor may be a dedicated device such as an ASIC, or may be an ARM processor.

Memory 206 stores information accessible by processor 204, including instructions 208 that may be executed or otherwise used by the processor 204. It also includes data 218 that may be retrieved, manipulated or stored by the processor. The memory may be of any type capable of storing information accessible by the processor, including a computer-readable medium, or other tangible medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

Instructions 208 may be any set of instructions to be executed directly (such as binary machine code) or indirectly (such as scripts from any programming language) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance.

In addition, methods and routines of the instructions may include various programs or functions in accordance with aspects of the invention. For instance, instructions 210 may be executed to receive stay-scheduled probabilities 230 and job or task resource requirements 232 from the incoming jobs/tasks in cluster 226. Based on the received information, instructions 210 may be executed to perform job/task similarity estimation and task classifications.

The instructions may also include risk estimation instructions 212 to perform functions such as de-scheduling probability calculations, and backup task creation/optimization instructions 214 to perform functions such as delete/modification of the existing backup tasks in each class to ensure the validity of the backup tasks and ensure the tasks in each given class are guaranteed with the stay-scheduled probability targets.

Cluster status monitoring instructions 216 may be executed to observe and process cluster status information 228 to determine the updated resource requirements of the tasks in each class based on the cluster status information.

Instructions 208 may also be configured to perform distribution of risk management information 234, which includes backup tasks, to other cluster management entities to facilitate functions such as job scheduling, flow management or resource management. Instructions 208 may further include instructions to estimate failure probabilities of network elements in cluster 226 to facilitate the de-scheduling risk estimation.

Data 218 may be retrieved, stored or modified by processor 204 in accordance with the instructions 208. For instance, although the system and method is not limited by any particular data structure, the data may be stored in computer registers, in a relational database as a table having a plurality of different fields and records, XML documents or in other formats.

As illustrated, data 218 may include task class data 220 created in accordance with the task classification instructions and backup task creation/optimization instructions. The task class data 220 describes the properties of each class and may include information such as resource requirements of the tasks in the class, as well as the stay-scheduled probability targets of each task. Furthermore, the class data also stores information of the backup tasks created for each class by the risk manager.

Data 222 stores cluster status information that may be used by the risk manager to contain the de-scheduling probability within the desired limit. The status information may include, for example, job execution status and the updated resource requirements, failed machines/racks, outages of various cluster elements, and other information monitored and recorded by the risk manager.

Data 224 stores various types of empirical or estimated failure probabilities for use by the risk estimation and backup task creation instructions. These may include, for example, failure probabilities of network elements like switches, machines or racks, or job/task failure probabilities on one or more or combinations of these network elements.

The above-mentioned data may reside on risk manager 202 as illustrated in FIG. 2, or may be stored on distributed databases in the cluster associated with the risk manager. Processor 204 may execute instructions 208 to access these databases and retrieve data from therein.

Although FIG. 2 functionally illustrates the processor and memory as being within the same block, the processor and memory may actually comprise multiple processors and memories that may or may not be stored within the same physical housing. For example, the memory 206 may be one or more hard drives or other storage media located in a server farm of a data center. In another example, some of the instructions and data may be stored on removable read-only memory and others within a read-only computer chip. Some or all of the instructions and data may be stored in a location physically remote from, yet still accessible by, the processor. Similarly, the processor may actually comprise a collection of processors which may or may not operate in parallel. Accordingly, references to a processor, a computer, or a memory will be understood to include references to a collection of processors, machines or memories that may or may not operate in parallel.

Risk manager 202 may be at one node in cluster 226 and be capable of directly and indirectly communicating with other nodes in the cluster. For example, instead of monitoring the cluster information or estimating the resource requirements or the probability targets by itself, the risk manager may obtain the cluster information from other cluster management modules which reside in other nodes in cluster 226. In this instance, the risk manager may be at one of many nodes included in the cluster management infrastructure 132 illustrated in FIG. 1.

Although certain advantages are obtained when information is transmitted or received as noted above, other aspects of the system and method are not limited to any particular manner of transmission of information. For example, in some aspects, information may be sent via a tangible computer-readable medium such as a disk, tape, CD-ROM or solid-state memory such as a flash drive. In other aspects, the information may be transmitted in a non-electronic format and manually entered into the system. And, although some functions are indicated as taking place on a plurality of machines or servers, various aspects of the invention may be implemented by a single computer having a single processor.

Figure 3:
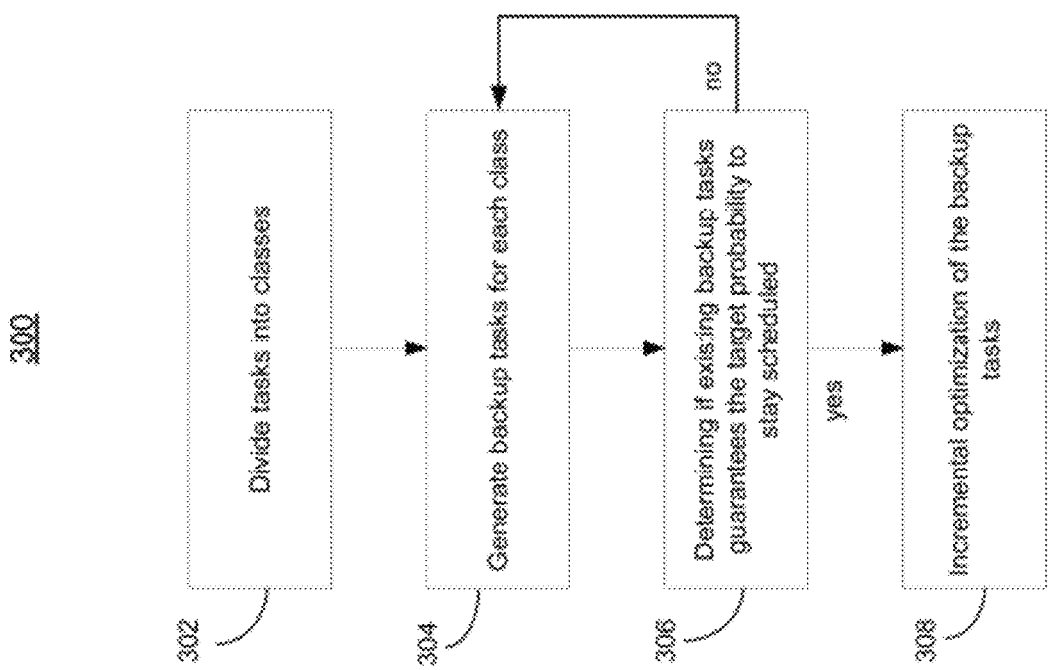
FIG. 3 is a main flow diagram in accordance with aspects of the invention.

FIG. 3 illustrates a flow chart 300 in accordance with aspects of the invention, where a risk management system in a computer cluster creates backup tasks for a plurality of tasks scheduled based on their probability targets to stay scheduled, estimated de-scheduling probabilities and resource requirements.

As shown in FIG. 3, the process preferably starts in block 302 with the risk management system dividing the scheduled tasks into classes based on the resource requirement of each task. The tasks in each class may come from heterogeneous jobs but have identical or similar resource requirements. The task classification may also be performed based on additional criteria such as preferred or to-be-avoided machines, racks or other network computing entities.

As shown in blocks 304 and 306, respectively, the system then performs an iterative process of generating the backup tasks and determining if the existing backup tasks can guarantee the probability targets to stay scheduled. In block 304, the number of the backup tasks may be increased by one in each iteration. Block 306 may be performed by estimating the de-scheduling probability of the tasks and comparing the estimated de-scheduling probability to the stay-scheduled probability targets. If the de-scheduling probability is greater than or equal to the probability targets, the process reverts back to block 304 and generate more backup tasks. If the de-scheduling probability is greater than the probability targets, no more backup tasks will be generated and the process proceeds to block 308.

In one scenario, the system starts with no classes and creates new classes for all the scheduled tasks. With later scheduled tasks, instead of creating new classes, the risk management system may match these tasks to a most suitable class based on the tasks' resource requirements and the properties of existing classes. The system may also modify the existing class to accommodate the new tasks.

In block 308, the risk management system performs incremental optimization of the backup tasks. The optimization may be performed by the risk management system by monitoring or receiving notifications from other cluster management entities of the changes to the tasks as well as to the cluster. These changes may include jobs/tasks finishing, changing or leaving the cluster. The changes may also include the outage of machines, congestion of a network node, crash of a computing process, the addition or removal of network elements, etc.

Based on the monitored information, the system determines if the existing backup tasks in each class still match the requirements of the tasks in the class. This may be performed periodically after an accrual of the changing events, or may be triggered by a changing event such as a job leaving a class. If the backup tasks in a class do not match the requirement of a particular scheduled task in that class, the system may determine that the scheduled task is not backed up, and perform modifications on the existing backup tasks or adding new backup tasks to the class.

In one example, the system may remove a backup task that is still valid but has become unnecessary due to its completion or leaving the cluster (e.g., returning to the user application with the completion results). In another example, the system may leave some extra backup tasks to avoid the possibility of growing the class again in the next round of classification or optimization of the tasks. In this way, the system efficiency is increased with the reduced amount of deletion or creation. In this situation, the number or the criteria of extra backup tasks to be left for each class may be predetermined.

In the optimization process, the system desirably removes any backup tasks that have become invalid due to events like machine failures. As such, unnecessary backup resources may be returned to the cluster in a timely manner to improve the utilization efficiency of the cluster resources.

Various other optimizations may also be performed by the system. For one example, jobs or tasks may be scheduled and executed without backup tasks created. This opt-out option may depend on the job objectives or policies associated with each job or task. In this situation, the system may decide to deny modifying or growing an existing class when the disruptions for the non-backed-up tasks during the optimization process are great. For example, when deletions of all the backup tasks and re-creations are required, modification or growing may be denied.

In another example, if the backup tasks in a given class become smaller (e.g., due to jobs finishing or leaving the cluster) and the backup tasks are to be reduced accordingly, the system may schedule all the reduced backup tasks on the same machine or rack, or on the least number of network elements possible in order to reduce any unnecessary computations or disruptions.

Figure 4:
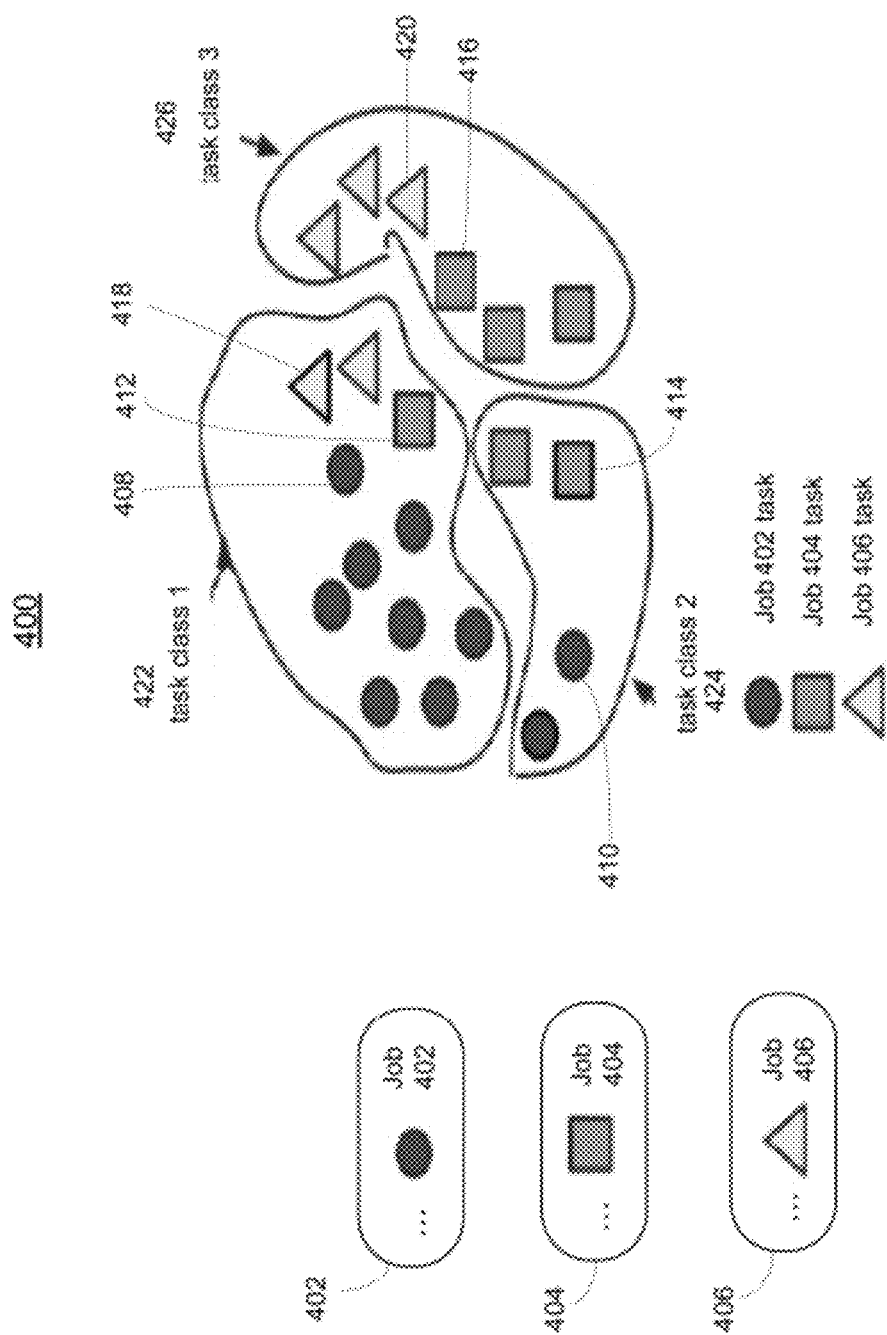
FIG. 4 is an exemplary scenario in accordance with aspects of the invention.

FIG. 4 illustrates an exemplary scenario 400 in which the risk management system operates in accordance with an aspect of the present invention. In this scenario, job 402 has 10 tasks, job 404 has 6 tasks and job 406 has 5 tasks, respectively. The tasks in each job may have different resource requirements and the tasks with similar resource requirements are pooled together into one class. For example, task 408 from job 402, task 412 from job 404 and task 418 from job 406 may have similar resource requirements and may be classified into "task class 1" (422). "Task class 2" (424) may include task 410 from job 402 and task 414 from job 404. Task 416 from job 404 may have similar resource requirement with task 420 from job 406, and therefore both tasks are put into "task class 3" (426).

In addition to the resource requirements, the risk management system may also classify the tasks by taking into account other criteria, such as scheduling policy or preference of machines to execute the job/task. These criteria may come from other cluster management entities such as a job scheduler or a resource manager as illustrated in FIG. 1, or alternatively, from the job-related information carried by each job. Thus, each class is a set of jobs/tasks that are similar in at least the resource requirements and other aspects.

Figure 5:
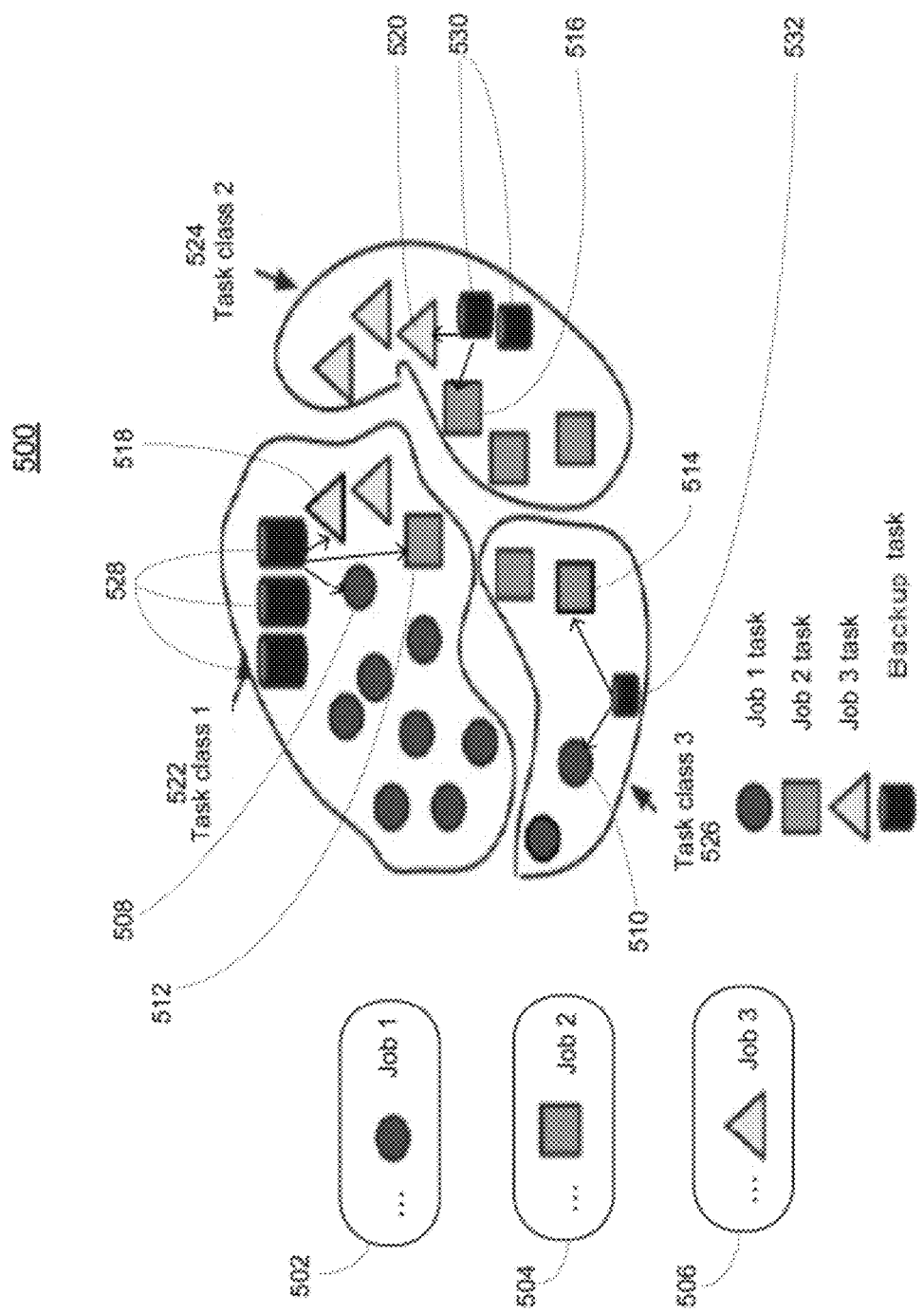
FIG. 5 is another exemplary scenario in accordance with aspects of the invention.

FIG. 5 illustrates another exemplary scenario 500 in which backup tasks are created by the risk management system in accordance with an aspect of the present invention. In each class, the backup tasks are identical and can replace any scheduled task in this class. As such, each backup task is associated with a set of cluster resources that can satisfy the maximum resource requirements of the scheduled tasks. For example, in "task class 1" (522), task 508 from job 502 may need 1 GB RAM and 1.0 CPU, task 512 from job 504 may need 10 MB RAM and 2.0 CPU and task 518 from job 506 may need 100 MB RAM and 1.5 CPU. Thus, each of the backup tasks 528 in task class should have at lest 1 GB RAM and 2.0 CPU to be able to replace either task 508, task 512 or task 518. Similarly, backup task 530 is able to accommodate the maximum resource requirements of the tasks in "task class 2" (524), and can replace task 516 and task 520. Backup task 532 in "task class 3" (526) is also allocated with the maximum resources needed for all the tasks in task class 3, and can replace task 510 and task 514.

Figure 6:
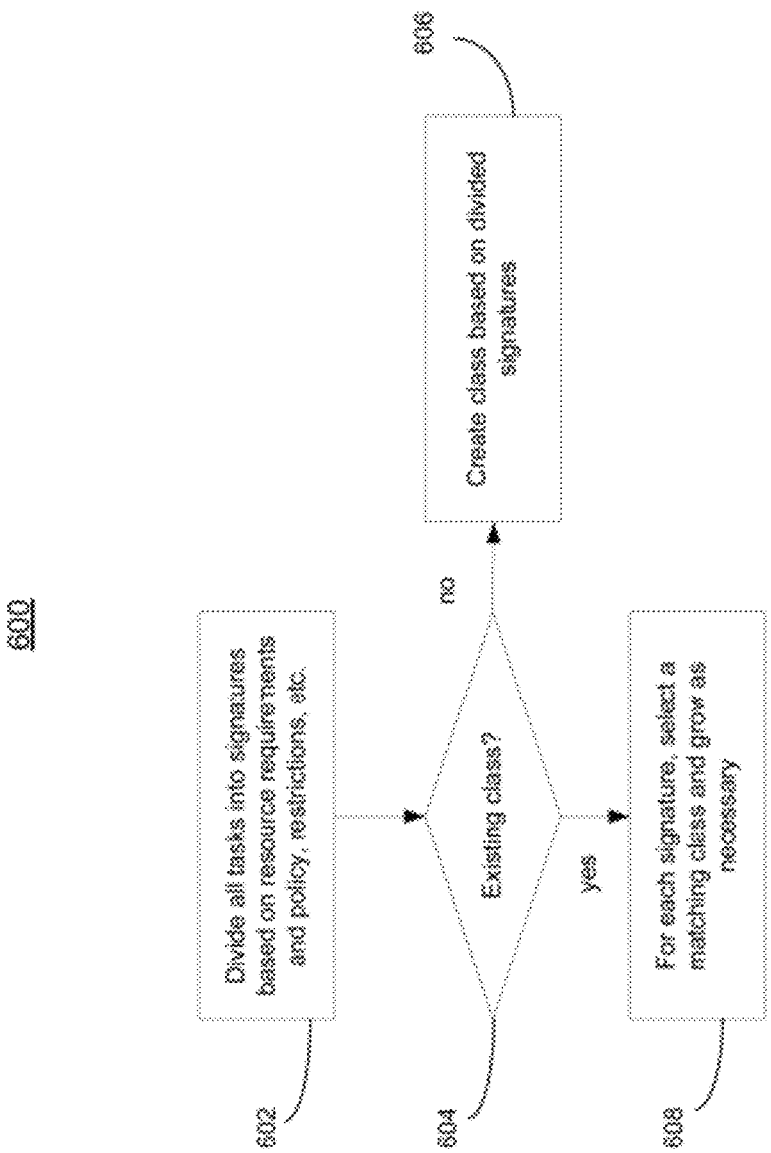
FIG. 6 is a flow diagram in accordance with aspects of the invention.
Figure 7:
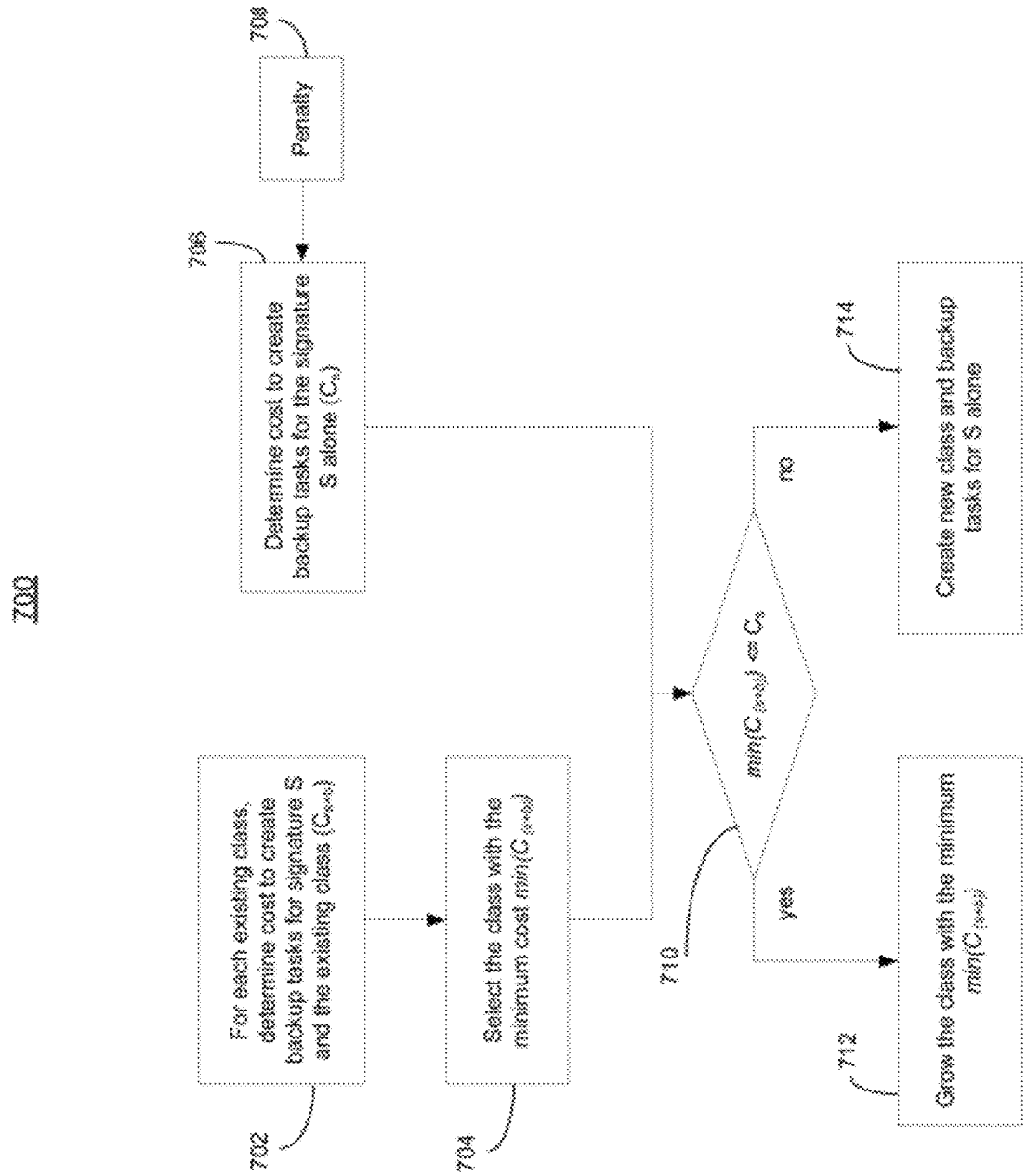
FIG. 7 is another flow chart in accordance with aspects of the invention.

Operations in accordance with aspects of the invention will now be described in detail with reference to processes illustrated in FIGS. 6-11. FIGS. 6-7 illustrate the operational breakdown of a detailed process of dividing tasks into classes (block 302 in FIG. 3). FIGS. 8-11 illustrate the operational breakdown of a detailed process of generating backup tasks and estimating if the existing backup tasks can guarantee the stay-scheduled probability targets. It should be understood that the following operations do not have to be performed in the precise order described below. Rather, various operations can be handled in a different order or simultaneously.

FIG. 6 illustrates a task classification process 600. In block 602, the system divides all the scheduled tasks into signatures (preliminary groups) such that in each given signature or preliminary group the tasks have identical or similar resource requirements and performance restriction (e.g., preferred/to-avoid machines/racks, etc.) or scheduling policies.

In block 604, the system determines if there is any existing class to which to allocate the tasks. If there is not, the process proceeds to block 606 to create classes based on the divided signatures or groups. If there is any existing class, the process proceeds to block 608 to select a matching class and modify the class as necessary.

FIG. 7 illustrates an exemplary process 700 according to which the system performs the operations in block 608, namely, selecting a class and modifying the class as necessary for each signature or each group of tasks. In block 702, for each existing class the system determines a cost, $C_{s+b}$, to create backup tasks in the respective class for signature S. Then in block 704, the system selects the class with the minimum cost, $\min(C_{(s+b)})$.

In block 706, the system determines a cost $C_s$ to create backup tasks for each signature alone. Since larger classes lead to greater resource utilization efficiency, a penalty 708 may be applied to the determination of cost $C_s$ to discourage creating singleton backup tasks. In block 710, the system compares the minimum cost to create backup tasks for the signature and the existing class ($\min(C_{(s+b)})$) to cost $C_s$. If $\min(C_{(s+b)})$ is less than or equal to $C_s$, the process proceeds to block 712 to create a new class for the signature alone and new backup tasks for the new class. If $\min(C_{(s+b)})$ is greater than $C_s$, the process proceeds to block 714 to grow the class with the minimum cost $\min(C_{(s+b)})$, by adding signature S to the class and creating extra backup tasks if necessary.

Process 700 may be iteratively performed on each created signature. The system may perform the iteration in various orders. For one example, the iteration may start with the signature for which the number of the compatible machines needed by the tasks in each signature is the lowest or the highest. Alternatively, the iteration order may be based on other restrictions, preferences or policies associated with the incoming tasks. In a further example, the iteration may be performed in a random order.

Instead of selecting a matching class and growing the class based on the costs to create the backup tasks, the system may determine the number of classes needed and a range of resource requirements for each class based on the range of resource requirements of all the tasks in the cluster. Thus, a given signature may fit exactly into a class.

Figure 8:
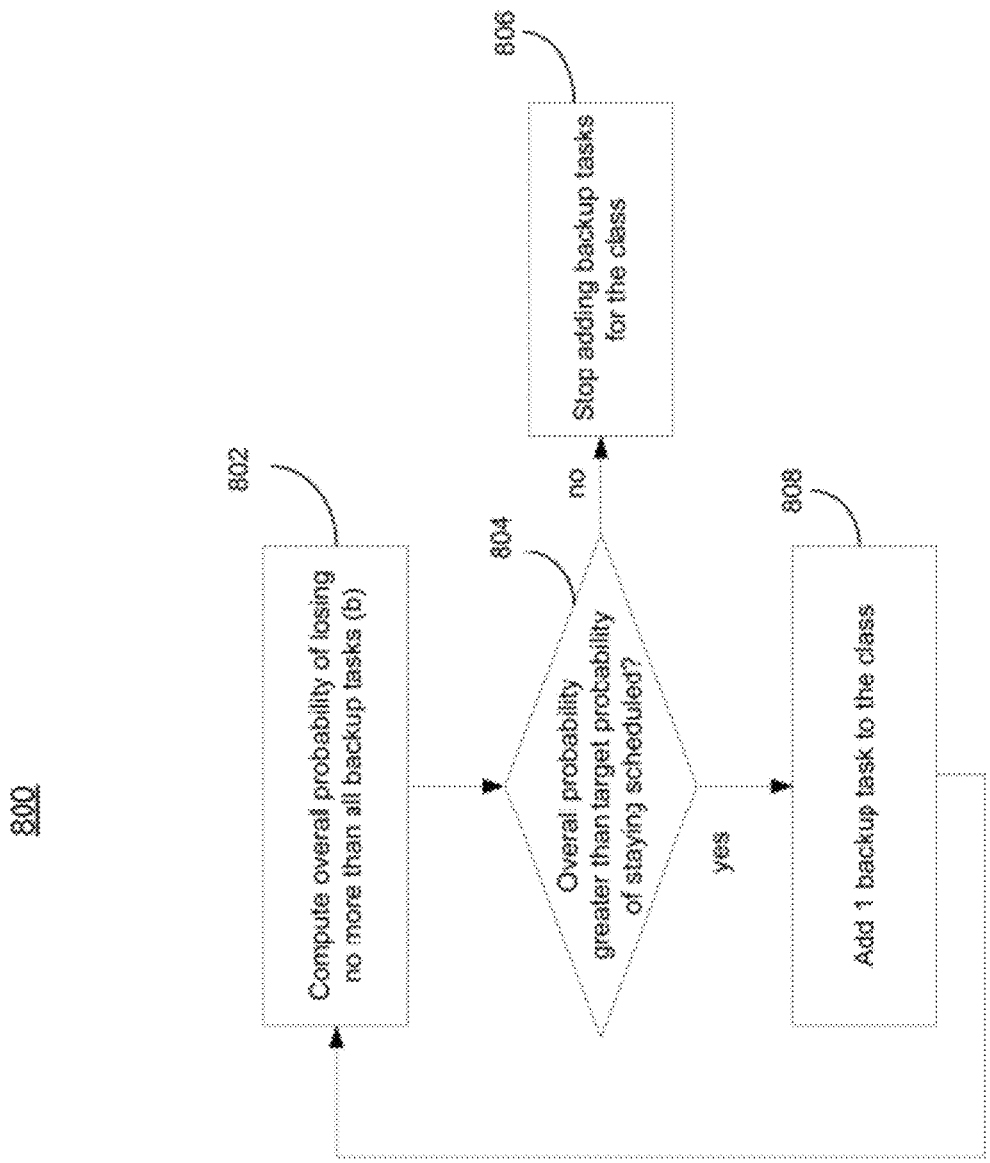
FIG. 8 is yet another flow diagram in accordance with aspects of the invention.

FIG. 8 illustrates an exemplary iterative process 800 according to which the system determines the number of backup tasks required for each class, and generates backup tasks accordingly. The process starts in block 802, where the system computes the overall probability of losing no more than all the (b) backup tasks for a given class with a number (n) of scheduled tasks therein.

Then in block 804, the system determines if this overall probability is greater than the stay-scheduled probability target of each task. If the comparison shows that the overall probability of losing b backup tasks is greater than the probability target, the process proceeds to block 808 where the risk management system adds one backup task to the class. Otherwise, there have been enough backup tasks in the class to ensure each of the n number of tasks to stay scheduled. Then the process proceeds to block 806 where the system stops generating backup tasks for the class.

Figure 9:
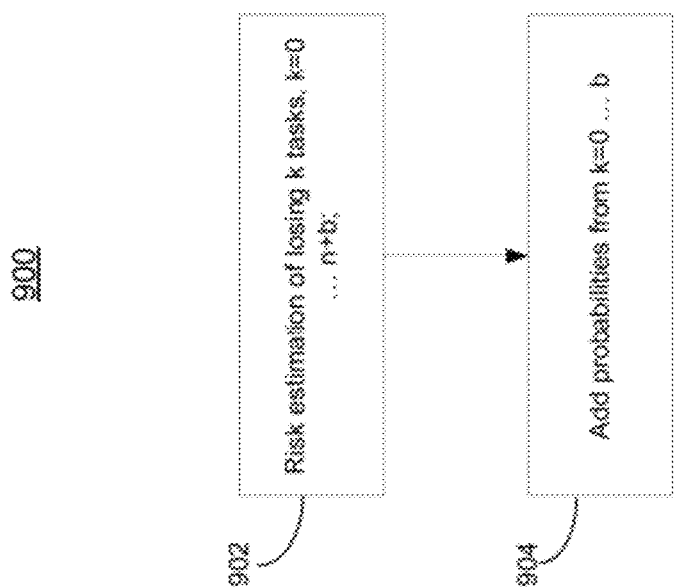
FIG. 9 is a further flow diagram in accordance with aspects of the invention.

FIG. 9 illustrates an exemplary process 900 where the system performs the operations in block 802, namely, computing an overall probability of losing no more than all b backup tasks in a given class. As shown, the system may first estimate the risk of losing k tasks for k=0 ... n+b, in block 902, then add these probabilities for k=0 ... b in block 904.

Figure 10:
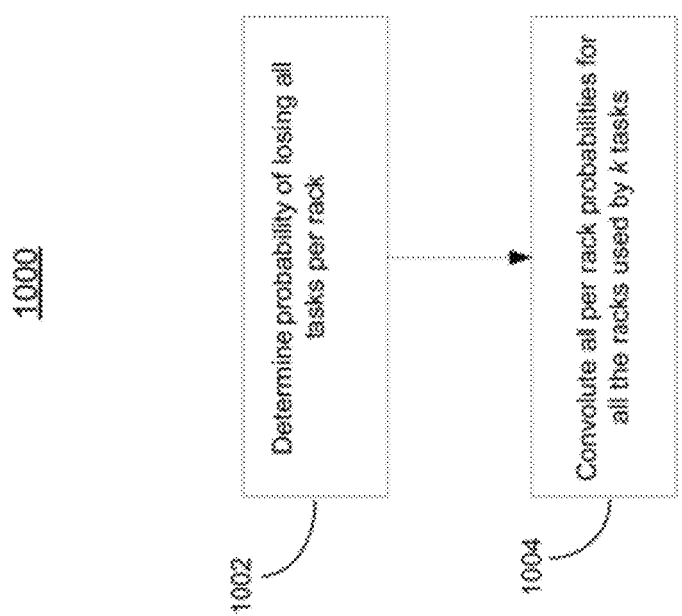
FIG. 10 is another flow diagram in accordance with aspects of the invention.
Figure 11:
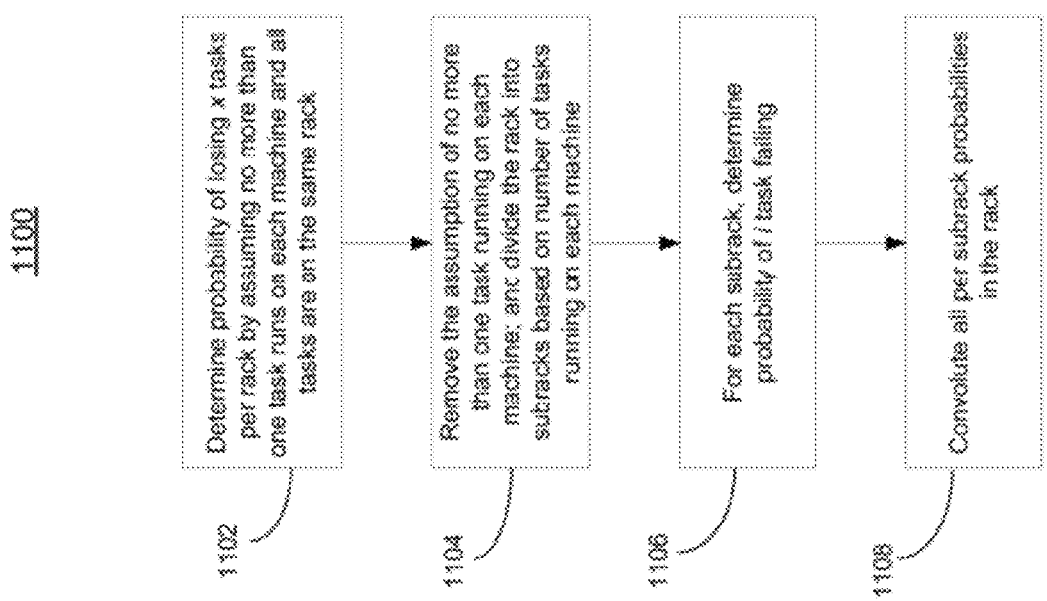
FIG. 11 is a further flow diagram in accordance with aspects of the invention.

FIG. 10 illustrates an exemplary process 1000 of how the risk estimation of losing k tasks for k=0 ... n+b may be performed by the system. The system may first determine in block 1002, for each rack (or other selected unit of the distributed computing elements in the cluster), the possibility of losing all the tasks on the rack. Then, in block 1004, the system removes the assumption of all the tasks being on a single rack by performing the convolution of the per rack probabilities for all the racks used by the k tasks in a given cluster.

To compute the per rack probability of losing tasks, the system may first use a set of preset assumptions and then remove these assumptions one by one in later calculations. As illustrated in the exemplary process 1100 in FIG. 11, the system may first calculate the failure probabilities of the tasks on the same rack. The process may start from block 1102, where the system calculates a probability density function $$P_r(f=x) \qquad (1)$$

that x tasks de-scheduled on a given rack r with an assumption that no more than one task runs on each machine and all the tasks are on the same rack, i.e., rack r. Here, rack r may be assumed to have at least m machines and R may be used to designate the number of machines used by the tasks residing on rack r.

$P_r(f=x)$ may be obtained from $p(r)$, $p(m|\sim r)$ and R where:

$$p(r)=\text{probability that rack } r \text{ fails} \qquad (2)$$

$$p(m|\sim r)=\text{probability that the machine } m \text{ fails but rack } r \text{ does not} \qquad (3)$$

The above failure probabilities $p(r)$ and $p(m|\sim r)$ may be estimated by the risk management system. Alternatively, these probabilities may be predetermined and obtained from an empirical data set such as data 224 shown in FIG. 2, or from other cluster management entities.

Thus, the following computations may be performed by the system to obtain $P_r(f=x)$:

$$P_r(f>R)=0; \qquad (4)$$

$$P_r(f=R)=p(r)+p(\sim r) \cdot PIr(f=R); \qquad (5)$$

$$P_r(f=x<R)=p(\sim r) \cdot PIr(f=x); \qquad (6)$$

$$PIr(f=x)=\text{Binomial}(x,R,p(m|\sim r)) \qquad (7)$$

Next, the process proceeds to block 1104. At this point, the assumption of no more than one task per machine is removed by dividing rack r into sub-racks such that within each sub-rack, each machine therein runs an identical number of tasks.

In block 1106, the system determines, for each sub-rack, the probability of i tasks failing. In other words, the system changes the above computations of the probability density function $PIr(f=x)$ to consider the situation where each failing machine brings down i tasks on each machine. Once the per sub-rack probability is obtained, discrete convolutions may be performed in block 1108 to add up all the per sub-rack probability density functions.

Figure 12:
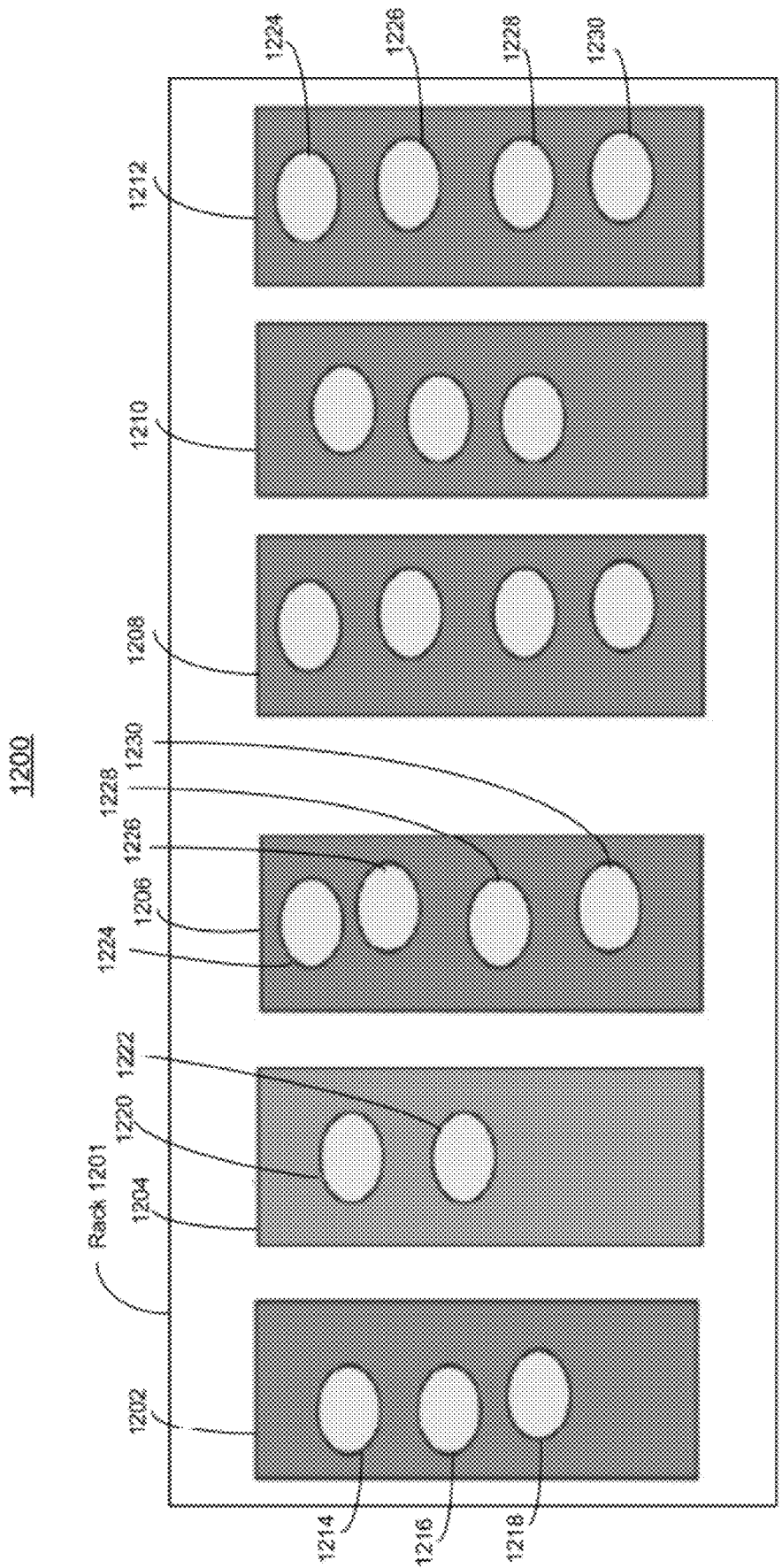
FIG. 12 is another exemplary scenario in accordance with aspects of the invention.
Figure 13:
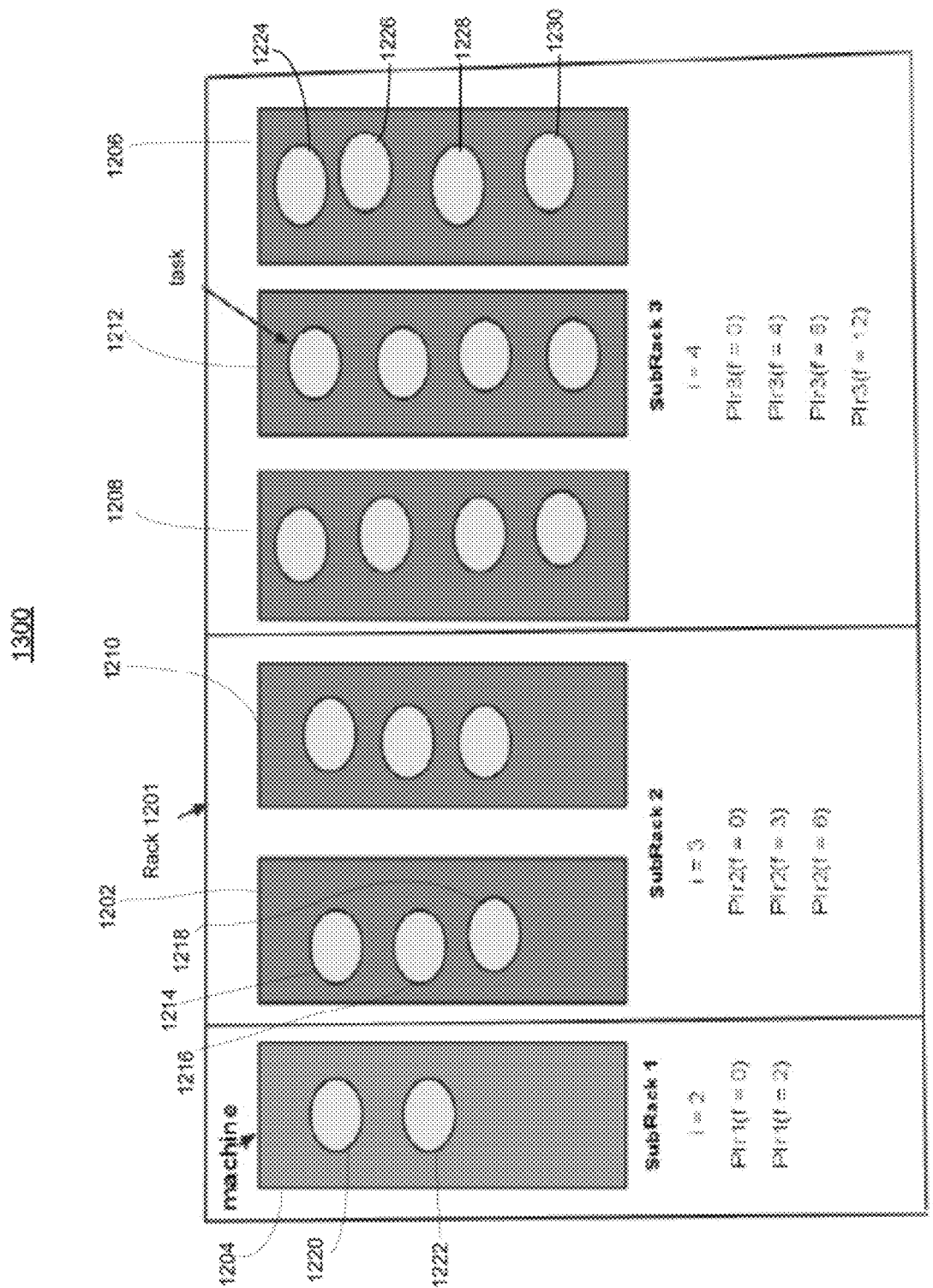
FIG. 13 is a further exemplary scenario in accordance with aspects of the invention.

FIGS. 12-13 show exemplary scenarios of the above processes in blocks 1104 and 1106. FIG. 12 illustrates a rack 1201 that houses six machines: 1202, 1204, 1206, 1208, 1210 and 1212. Each machine has one or more tasks scheduled to run and to consume the machine resources. For example, machine 1202 has task 1214, task 1216 and task 1218. Machine 1204 has task 1220 and 1222, while task 1224, 1226 and 1228 reside on machine 1206. Machines 1208, 1210 and 1212 have four, three and four tasks running thereon, respectively.

FIG. 13 shows a scenario 1300 where the rack 1201 is divided into three sub-racks: sub-rack 1, sub-rack 2 and sub-rack 3. Each sub-rack desirably houses machines with an identical number of tasks running thereon. After the division, sub-rack 1 houses the two-task machine 1204, sub-rack 2 houses the three-task machines 1202 and 1210, and sub-rack 3 houses the four-task machines 1206, 1208 and 1212. As such, the possible failure scenarios with each sub-rack can only bring down $i \times R_{sub}$ number of tasks. Here, i is the number of tasks running on each machine in the sub-rack and $R_{sub}$ is an integer number from 0 to the maximum number of machines on each sub-rack $r_{sub}$. Specifically, in scenario 1300, sub-rack 1 may only lose 0 or 2 number of tasks, and sub-rack 2 may only lose 0, 3 or 6 number of tasks. It is possible for sub-rack 3 to lose 0, 4, 8 or 12 number of tasks. Each of these probabilities follows a binomial distribution.

With known failure probability of each independent machine $p(m|\sim r)$, the probability density function that maps to the probability of losing $x=i \times R_{sub}$ number of tasks $$P_{r_{sub}}(f=x) \qquad (8)$$

may be easily obtained by finding the binomial distribution $$PIr_{sub}(f=x)=\text{Binomial}(x,R_{sub},p(m|\sim r_{sub})) \qquad (9)$$

for each sub-rack $r_{sub}$ from sub-rack 1 to 3 with respective $R_{sub}$ number of machines.

As illustrated in FIG. 13, for sub-rack 1 where i=2 and $R_{sub}=1$, the system calculates $PIr_{sub1}(f=0)$ and $PIr_{sub1}(f=2)$. For sub-rack 2 where i=3 and $R_{sub}=2$, $PIr_{sub2}(f=0)$, $PIr_{sub2}(f=3)$ and $PIr_{sub2}(f=6)$ are obtained. For sub-rack 3 where i=4 and $R_{sub}=3$, $PIr_{sub3}(f=0)$, $PIr_{sub3}(f=4)$, $PIr_{sub3}(f=8)$ and $PIr_{sub3}(f=12)$ are calculated.

Once the probability distributions on a per-sub-rack basis are found, the probability density function $P_{r_{1201}}(f=x)$ for rack 1201 may be found by computing convolutions of the binomial distributions for all the sub-racks 1-3. As it is not possible to lose a fraction of a task, the convolutions here are discrete convolutions.

As the previous discussions regarding process 1000 in FIG. 10 go, once the per-rack pdfs (probability density functions) are obtained, the assumption of a single rack is removed by performing convolutions on these pdfs to add up the per-rack probability density functions in a given cluster.

Besides the probability that rack r fails and the probability that machine m fails but rack r does not, any other failure probabilities or correlations between the descheduling risks of the tasks and the failures of a particular network or cluster element may be used by the system to obtain the failure probability of x tasks on a given rack. In this regard, similar divisions of lower-level cluster elements housed on, or coupled with, a higher level cluster element may be performed such that the higher-level cluster element are divided into sub-elements, as discussed above with regard to scenarios 1200 and 1300. For example, if the failure probability of a switch is to be employed in the calculations, a switch may be divided into sub-switches. In this example, each respective sub-switch is coupled with racks having an identical number of machines, and each rack may be further divided in a way similar to scenarios 1200 and 1300. Thus, the failure probability of any cluster element on any hierarchy order in the cluster may be used by the risk management system. Although FIGS. 12 and 13 illustrate a two-level hierarchy scenario that involves a machine level and a rack level, systems and methods according to aspects of the invention may involve further multi-level scenarios. In addition, the cluster elements are not limited to machines and racks.

The system may also be refined to take into account of different failure probabilities for network or cluster elements of the same type. For example, different machines may have different failure probabilities and different racks or switches may also associate with different failure probabilities.

It will be further understood that the sample values, types and configurations of data described and shown in the figures are for the purposes of illustration only. In that regard, systems and methods in accordance with aspects of the invention may include various types of computer clusters, networks, transmission devices, operation terminals, servers, data values, data types and configurations. The data may be provided and received at different times (e.g., via different servers or databases) and by different entities (e.g., some values may be pre-suggested or provided from different sources).

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

Unless expressly stated to the contrary, every feature in a given embodiment, alternative or example may be used in any other embodiment, alternative or example herein. For instance, any method for determining the per job stay-scheduled probability target may be employed in any configuration herein. Each way of monitoring or obtaining job/task execution status and cluster status may be used in any configuration herein. The risk management system may communicate with various cluster management entities in the cluster with any of the configurations herein. Various backup task optimization methods or iteration order to generate task signatures may be employed.

The invention claimed is:

1. A computer-implemented method executable by a processor for allocating backup tasks to a plurality of tasks scheduled to run in a computer cluster, the method comprising:
   classifying the plurality of scheduled tasks into one or more task groups based on one or more resource requirements associated with each task, each task group containing at least one of the scheduled tasks;
   determining, for at least a respective one of the task groups, a number of backup tasks necessary to guarantee that the scheduled tasks of the respective task group satisfy a target probability for execution; and
   the processor generating the backup tasks based on the determined number of backup tasks, where the generated backup tasks for the respective task group are all identical, and each generated backup task in the respective task group is configured such that it can replace any scheduled task in the respective task group,
   wherein determining the number of backup tasks comprises:
   calculating a probability of losing no more than all current backup tasks in a given one of the plurality of task groups;
   comparing the calculated probability to the target probabilities for execution of the tasks in the task group;
   in response to a comparison outcome indicating that the calculated probability is greater than or equal to all the target probabilities, adding one backup task to a class of the given task group and performing said steps of calculating and comparing again; and
   in response to a comparison outcome indicating that the calculated probability is less than all the target probabilities, ceasing to add backup tasks to the given task group and performing said steps of calculating and comparing again.

2. The method of claim 1, wherein the computer cluster includes first and second cluster elements, the first cluster element comprising a machine and the second cluster element comprising a rack that houses the machine.

3. The method of claim 2, wherein determining the number of backup tasks is based on at least one of a failure probability of the first cluster element and a failure probability of the second cluster element.

4. The method of claim 1, wherein each scheduled task of the respective task group is linked with a job, and each job is associated with the target probability for execution of its linked task.

5. The method of claim 1, wherein each task group contains tasks with identical resource requirements.

6. The method of claim 1, wherein one of the resource requirements for a selected one of the scheduled tasks is a memory range requirement.

7. The method of claim 1, wherein the computer cluster includes a plurality of first computer cluster elements and a plurality of second computer cluster elements, the method further comprising:
   receiving, from each scheduled task, a preference for execution by a given one of the plurality of the first computer cluster elements or a given one of the plurality of the second computer cluster elements, wherein the classification is performed based on the received preference.

8. The method of claim 1, further comprising:
   determining a first cost to create the backup tasks for the respective task group;
   for each task group, determining a second cost to create additional backup tasks for a combination group that includes the respective task group, the determining the second cost being obtained by dividing the plurality of scheduled tasks and the respective task group;
   comparing the first cost with the second cost;
   creating the backup tasks for the respective task group in response to a comparison result indicating the first cost is less than the second cost; and
   creating the additional backup tasks for the combination group in response to a comparison result indicating the first cost is larger than or equal to the second cost.

9. The method of claim 1, wherein calculating the probability of losing no more than all current backup tasks is based on at least one of a failure probability of a first cluster element in the cluster, a failure probability of a second cluster element in the cluster, and the number of current backup tasks in the given task group.

10. The method of claim 1, wherein the cluster includes a plurality of first and second cluster elements, and calculating the probability of losing no more than all current backup tasks further comprises:
   for each second cluster element used by the scheduled tasks in the given task group, dividing the second cluster elements into sub-second-elements, the sub-second elements each including one or more of the first cluster elements, and where each of the first cluster elements in each respective sub-second-element executes the same number of the scheduled tasks; and
   for each sub-second-element, calculating a probability of losing no more than all the scheduled tasks therein based on a failure probability of the first cluster elements in the respective sub-second-element, the number of the first cluster elements in the respective sub-second element, and the number of the scheduled tasks in the respective sub-second-element.

11. The method of claim 1, further comprising:
   monitoring task execution status and cluster status; and
   performing modification or deletion of the backup tasks in the respective task group based on the monitoring.

12. The method of claim 1, wherein the computer cluster includes first and second cluster elements, and the method further comprises estimating a failure probability of the first cluster element and a failure probability of the second cluster element; and
   where a number of backup tasks necessary is determined based on the estimated failure probabilities.

13. The method of claim 12, wherein determining the number of backup
   tasks is further based on a failure probability of a third cluster element in the computer cluster, the third cluster element comprising at least a cluster element other than the first and the second cluster elements.

14. The method of claim 1, where each scheduled task is associated with a target probability of execution; and
   where the step of determining includes determining, for at least a respective one of the task groups, a number of backup tasks necessary to guarantee that all the scheduled tasks of the respective task group satisfy their associated target probabilities for execution.

15. A system to generate backup tasks for a plurality of tasks scheduled to run in a computer cluster, the system comprising:
   a memory; and
   a processor coupled to the memory and configured to execute a set of instruction stored in the memory to:
   classify the plurality of scheduled tasks into one or more task groups based on one or more resource requirements associated with each task, each scheduled task being associated with a target probability for execution, each scheduled task being executable by a first cluster element and a second cluster element, each task group containing at least one of the scheduled tasks;
   determine, for at least a respective one of the task groups, a number of backup tasks necessary to guarantee that the scheduled tasks of the respective task group satisfy their associated target probabilities for execution; and
   generate the backup tasks based on the determined number of backup tasks necessary, where the generated backup tasks for the respective task group are all identical, and each generated backup task in the respective task group is configured such that it can replace any scheduled task in the respective task group,
   wherein the processor determines the number of backup tasks by iteratively executing the instructions for
      calculating a probability of losing no more than all current backup tasks in a given one of the plurality of task groups;
      comparing the calculated probability to the target probabilities for execution of the tasks in the task group;
      in response to a comparison outcome indicating that the calculated probability is greater than or equal to all the target probabilities, adding one backup task to a class of the given task group and performing said steps of calculating and comparing again; and
      in response to a comparison outcome indicating that the calculated probability is less than all the target probabilities, ceasing to add backup tasks to the given task group and performing said steps of calculating and comparing again.

16. The system of claim 15, wherein one of the resource requirements for a selected one of the scheduled tasks is a memory range requirement.

17. The system of claim 15, wherein the first cluster element comprises at least one of a plurality of machines and the second cluster element comprises at least one of a plurality of racks.

18. The system of claim 15, wherein the first cluster element comprises a plurality of the first cluster elements, the second cluster element comprises a plurality of
   the second cluster elements, and the processor is further configured to:
   receive, from each scheduled task, a preference for execution by a given one of the plurality of the first cluster elements or a given one of the plurality of the second cluster elements, wherein the classification is performed based on the received preference.

19. The system of claim 15, wherein the processor is further configured to:
- determine a first cost to create the backup tasks for the respective task group, for each task group, determine a second cost to create additional backup tasks for a combination group that includes the respective task group, the determined second cost being obtained by dividing the plurality of scheduled tasks and the respective task group;
- compare the first cost with the second cost;
- create the backup tasks for the respective task group in response to a comparison result indicating the first cost is less than the second cost; and
- create the additional backup tasks for the combination group in response to a comparison result indicating the first cost is larger than or equal to the second cost.

20. The system of claim 15, wherein the first cluster element comprises a plurality of first cluster elements, the second cluster element comprises a plurality of second cluster elements, and the processor is further configured to calculate a probability of losing no more than all current backup tasks in a given task group by:
- for each second cluster element used by the scheduled tasks in the given task group, dividing the second cluster element into sub-second-elements, the sub-second elements each including one or more of the first cluster elements, and each of the first cluster elements in each respective sub-second-element executes the same number of the scheduled tasks; and
- for each sub-second-element, calculating a probability of losing no more than all the scheduled tasks therein based on a failure probability of the first cluster elements in the respective sub-second-element, the number of the first cluster elements in the respective sub-second-element, and the number of the scheduled tasks in the respective sub-second-element.

21. The system of claim 15, wherein the processor is further configured to:
- monitor task execution status and cluster status; and
- perform modification or deletion of the backup tasks in the respective task group based on the monitoring.

22. The system of claim 15, wherein the processor is further configured to estimate a failure probability of the first cluster element and a failure probability of the second cluster element.

23. The system of claim 15, wherein the processor is further configured to determine the number of backup tasks based on a failure probability of a third cluster element in the computer cluster, the third cluster element comprising at least a cluster element other than the first and the second cluster elements.

* * * * *